(12) United States Patent
Haans et al.

(10) Patent No.: US 8,303,249 B2
(45) Date of Patent: Nov. 6, 2012

(54) WIND TURBINE AND METHOD FOR OPTIMIZING ENERGY PRODUCTION THEREIN

(75) Inventors: Wouter Haans, The Hague (NL); Lawrence D. Willey, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 646 days.

(21) Appl. No.: 12/486,101

(22) Filed: Jun. 17, 2009

(65) Prior Publication Data

US 2010/0322766 A1    Dec. 23, 2010

(51) Int. Cl.
*F03D 7/06* (2006.01)

(52) U.S. Cl. .......................................... 416/1

(58) Field of Classification Search ............... 290/44; 415/914; 416/228, 231 B, 1
See application file for complete search history.

(56) References Cited

U.S. PATENT DOCUMENTS

| 6,940,185 | B2 | 9/2005 | Andersen et al. |
| 7,387,491 | B2 | 6/2008 | Saddoughi et al. |
| 2007/0231151 | A1 | 10/2007 | Herr et al. |

FOREIGN PATENT DOCUMENTS

| EP | 1674723 A2 | 6/2006 |
| WO | 2008080407 A1 | 7/2008 |

*Primary Examiner* — Christopher Verdier
*Assistant Examiner* — Jason Davis
(74) *Attorney, Agent, or Firm* — James McGinness, Esq.; Armstrong Teasdale LLP

(57) ABSTRACT

A method for optimizing energy production in a wind turbine includes pitching a plurality of rotor blades to a full operational angle, and utilizing an active flow control device in accordance with a generator speed and a rotor blade pitch setting to facilitate maintaining a predetermined generator rated power level.

21 Claims, 6 Drawing Sheets

WIND TURBINE AND METHOD FOR OPTIMIZING ENERGY PRODUCTION THEREIN

BACKGROUND OF THE INVENTION

The field of the disclosure relates generally to wind turbines and, more particularly, to active flow control for wind turbine blades.

Wind turbines are increasingly gaining importance in the area of renewable sources of energy generation. In recent times, wind turbine technology has been applied to large-scale power generation applications. Of the many challenges that exist in harnessing wind energy, one is maximizing wind turbine performance while minimizing system loads in given wind conditions. Non-limiting examples of improved wind turbine performance parameters, which lead to minimized cost of energy, include maximized aerodynamic efficiency, maximized energy output, minimized wind turbine system loads, minimized noise, and combinations thereof. Examples of wind turbine system loads include extreme loads (operational and parked/idling) and fatigue loads.

In general, flow separation over wind turbine blades leads to stall, which is often a limiting factor in wind turbine blade design. When stall occurs, lift generated by the blade decreases significantly and a large component of the torque, which is the driving force imparted by the wind to the wind turbine, is lost. Solutions that provide an ability to control (diminish or delay) separation will allow the wind turbine blade to maximize lift. Some passive flow control solutions, for example, vortex generators, have been applied to remedy the boundary layer separation problem, but in such solutions there is no provision to stop the flow control when the flow control becomes unnecessary or undesirable. For example, one of the principal constraints in wind turbine design is that caused by system loads. When a separation control solution is being used to enhance lift, the blade experiences higher loading that can reach failure-inducing levels if the wind conditions change beyond normal operational or expected levels.

One effective approach for increasing the energy output of a wind turbine is to increase the swept area of the blades, for example, by increasing rotor size (diameter). However, rotor size may be constrained by blade/tower clearances as well as the higher system loads on the larger rotor due to structural and material limitations. Another challenge is posed by changing wind conditions such as wind gusts or storms that lead to an undesired dynamic loading of the wind turbine blade as the lift being generated fluctuates or increases to very large levels. These loads constraints often lead to increased cost of the blade and other components of the wind turbine system, which can reduce or cancel the benefits of growing the rotor in terms of a system-level metric like cost of energy.

BRIEF DESCRIPTION OF THE INVENTION

In one aspect, a method for optimizing energy production in a wind turbine is provided. The method includes pitching a plurality of rotor blades to a full operational angle, and activating an active flow control device in combination with a generator speed and a rotor blade pitch setting to facilitate maintaining a predetermined generator rated power level.

In another aspect, a method of operating a wind turbine is provided. The method includes operatively coupling an active flow control device to a control system within the wind turbine, pitching a plurality of rotor blades to a full operational angle, and activating an active flow control device prior to achieving a generator rated power for the wind turbine. Upon achieving a rated speed of the wind turbine, the method includes increasing the active flow control device to a full operational mode. Upon achieving the generator rated power, the method includes decreasing the active flow control device from the full operational mode.

In yet another aspect, a wind turbine is provided. The wind turbine includes a plurality of rotor blades, an active flow control device operatively coupled to a respective rotor blade, and a control system communicatively coupled to the active flow control device and configured to optimize energy production in the wind turbine based on a generator speed, a rotor blade pitch setting and an active flow control device setting. The control system includes a processor that is programmed to pitch the plurality of rotor blades to a full operational angle, and activate the active flow control device prior to achieving a generator rated power for the wind turbine.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
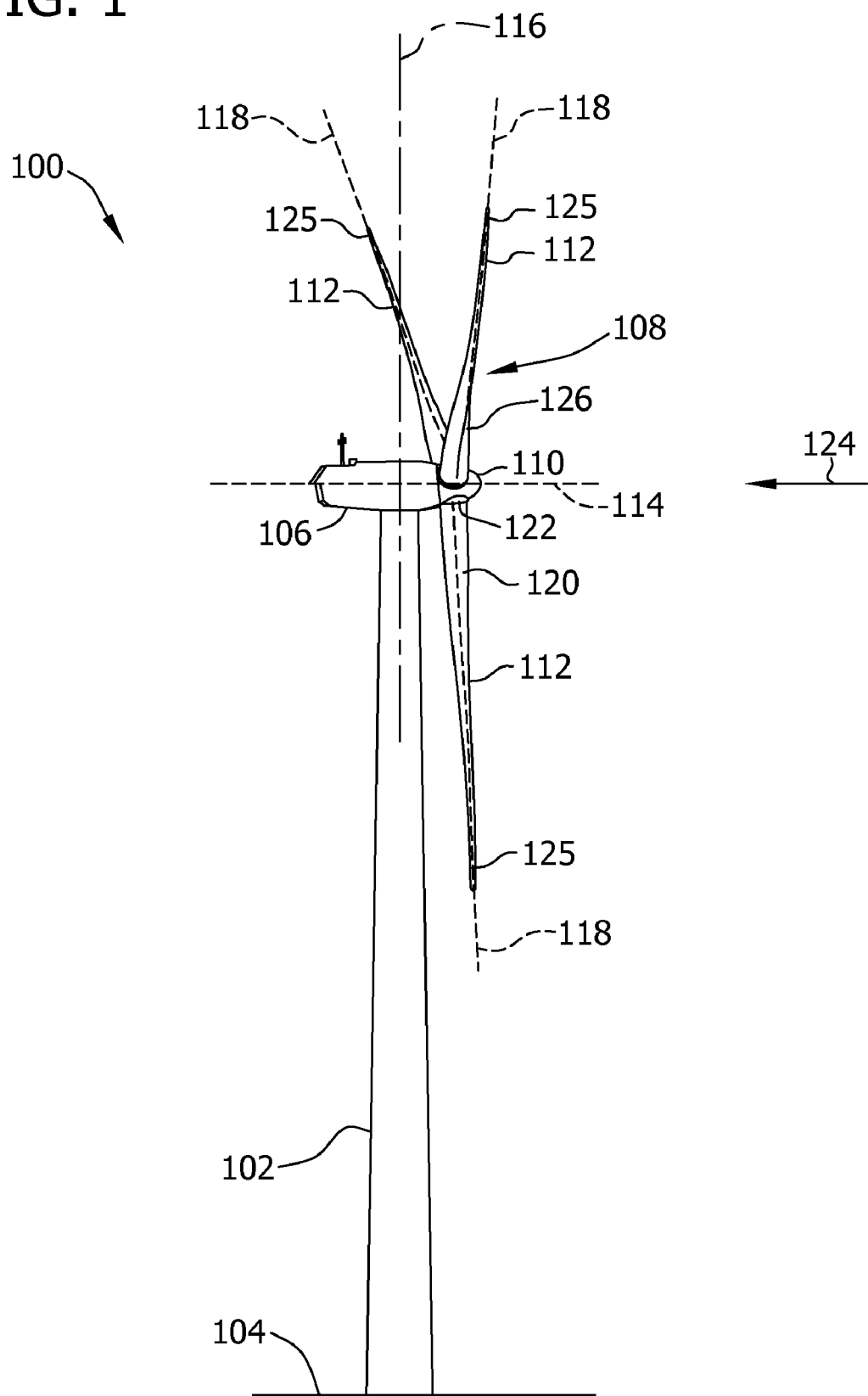
FIG. 1 is a side perspective view of an exemplary wind turbine.

FIG. 1 is a perspective side view of an exemplary wind turbine 100. In the exemplary embodiment, wind turbine 100 is a horizontal axis wind turbine. Alternatively, wind turbine 100 may be a vertical axis wind turbine. Wind turbine 100 has a tower 102 extending from a supporting surface 104, a nacelle 106 coupled to tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine 100 to function as described herein. In the exemplary embodiment, tower 102 is fabricated from tubular steel and has a cavity (not shown in FIG. 1) extending between supporting surface 104 and nacelle 106. Alternatively, tower 102 is any tower that enables wind turbine 100 to function as described herein including, but not limited to, a lattice tower. Tower 102 has any suitable height that enables wind turbine 100 to function as described herein.

Rotor blades 112 are positioned about hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control a perspective of rotor blades 112 with respect to a direction of wind 124. Rotor blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in rotor blades 112 are transferred to hub 110 via load transfer regions 122. Each rotor blade 112 also includes a blade tip portion 125.

In the exemplary embodiment, rotor blades 112 have a length between 30 meters (m) (98 feet (ft)) and 100 m (328 ft), however these parameters form no limitations to the instant disclosure. Alternatively, rotor blades 112 may have any length that enables wind turbine 100 to function as described herein. As wind 124 strikes each rotor blade 112, blade lift forces (not shown) are induced on each rotor blade 112 and rotation of rotor 108 about rotation axis 114 is induced as each rotor blade 112 and blade tip portions 125 are accelerated. A pitch angle (not shown) of rotor blades 112, i.e., an angle that determines a perspective of each rotor blade 112 with respect to the direction of wind 124, may be changed by a pitch adjustment mechanism (not shown in FIG. 1). Specifically, increasing a pitch angle of rotor blade 112 decreases a blade surface area 126 (i.e., lowers the airfoil angle of attack and thus lowers the lift force exerted on rotor blade 112) of respective rotor blade 112 that is exposed to wind 124. Conversely, decreasing a pitch angle of blade 112 increases blade surface of area 126 (i.e., increases the airfoil angle of attack and thus increases the lift force in the absence of stall) of respective rotor blade 112 that is exposed to wind 124.

For example, a blade pitch angle of approximately 0 degrees (sometimes referred to as a "power position") exposes a significant percentage of a blade surface area 126 to wind 124, thereby resulting in inducement of a first value of lift forces on blade 112. Similarly, a blade pitch angle of approximately 90 degrees (sometimes referred to as a "feathered position") exposes a significantly lower percentage of blade surface area 126 to wind 124, thereby resulting in inducement of a second value of lift forces on blade 112. The first value of lift forces induced on rotor blades 112 is greater than the second value of lift forces induced on rotor blades 112 such that values of lift forces are proportional to blade surface area 126 (i.e., airfoil angle of attack) exposed to wind 124. Therefore, values of lift forces induced on rotor blades 112 are proportional to values of blade pitch angle.

Also, for example, as blade lift forces increase, a rotational speed of rotor blade 112 and blade tip portion 125 increases. Conversely, as blade lift forces decrease, the rotational speed of rotor blade 112 and blade tip portion 125 decreases. Therefore, values of the linear speed of blade tip portion 125 are proportional to values of the lift forces induced on rotor blades 112 and it follows that the rotational speed of rotor blade 112 and blade tip portion 125 is proportional to the blade pitch angle.

Moreover, as the rotational speed of rotor blade 112 and blade tip portion 125 increases, an amplitude (not shown) of acoustic emissions (not shown in FIG. 1) from blade 112 increases. Conversely, as the rotational speed of rotor blade 112 and blade tip portion 125 decreases, the amplitude of acoustic emissions from rotor blades 112 decreases. Therefore, the amplitude of acoustic emissions from rotor blades 112 is proportional to the rotational speed of rotor blade 112 and blade tip portions 125 and it follows that the amplitude of acoustic emissions from rotor blades 112 is proportional to the blade pitch angle.

A pitch angle of rotor blades 112 is adjusted about a pitch axis 118 for each blade 112. In the exemplary embodiment, the pitch angles of rotor blades 112 are controlled individually. Alternatively, the pitch angles may be controlled as a group. In yet another alternative embodiment, the pitch of rotor blades 112, and the speed of rotor blades 112 may be modulated in order to reduce acoustic emissions. In one embodiment, wind turbine 100 may be controlled to reduce the potential acoustic emissions by a local controller (not shown), or remotely via a remote controller (not shown) to reduce noise.

Figure 2:
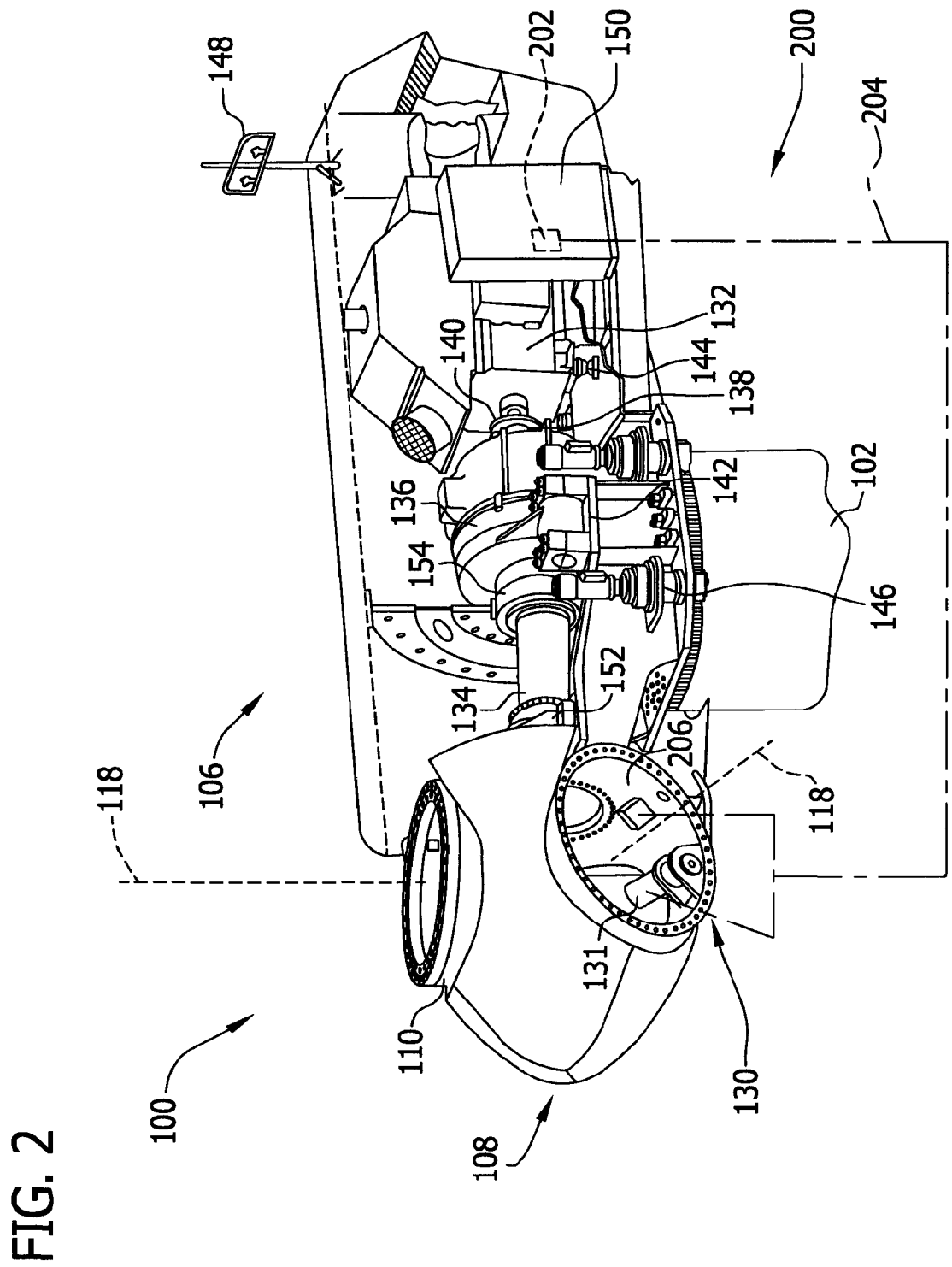
FIG. 2 is a partial cross-sectional perspective view of a nacelle used with the exemplary wind turbine shown in FIG. 1.

FIG. 2 is a cross-sectional perspective view of nacelle 106 of exemplary wind turbine 100. Various components of wind turbine 100 are housed in nacelle 106 atop tower 102 of wind turbine 100. Hub 110 includes a plurality of pitch drive mechanisms wherein one pitch drive mechanism 130 is coupled to one blade 112 (shown in FIG. 1). Pitch drive mechanism 130 modulates the pitch of associated blade 112 along pitch axis 118. For the exemplary wind turbine 100 having three rotor blades 112, only one of three pitch drive mechanisms 130 is shown in FIG. 2, wherein each pitch drive mechanism 130 includes at least one pitch drive motor 131. Pitch drive motor 131 is any electric motor driven by electrical power that enables pitch drive mechanism 130 to function as described herein. Alternatively, pitch drive mechanism 130 includes any suitable structure, configuration, arrangement, and/or component such as, but not limited to, hydraulic cylinders, springs, and servomechanisms. Moreover, pitch drive mechanism 130 may be driven by any suitable means such as, but not limited to, hydraulic fluid and/or mechanical power, such as, but not limited to, induced spring forces and/or electromagnetic forces.

Nacelle 106 also includes rotor 108 that is rotatably coupled to an electric generator 132 positioned within nacelle 106 via rotor shaft 134 (sometimes referred to as a low speed shaft), a gearbox 136, a high speed shaft 138, and a coupling 140. Rotation of rotor shaft 134 rotatably drives gearbox 136 that subsequently rotatably drives high speed shaft 138. High speed shaft 138 rotatably drives electric generator 132 via coupling 140 and high speed shaft 138 rotation results in the production of electrical power by electric generator 132. Gearbox 136 and generator 132 are supported by supports 142 and 144, respectively. In the exemplary embodiment, gearbox 136 utilizes a multiple load path gear arrangement to drive high speed shaft 138. Alternatively, in direct drive configurations, main rotor shaft 134 is coupled to electric generator 132.

Nacelle 106 further includes a yaw drive assembly 146 that is used to rotate nacelle 106 and rotor 108 on axis 116 (shown in FIG. 1) to control the perspective of rotor blades 112 with respect to the direction of wind 124, as described in more detail herein. Nacelle 106 also includes at least one meteorological mast 148. Mast 148 includes a wind vane and anemometer (neither shown in FIG. 2). Mast 148 provides information to a turbine control system (not shown) that may include wind direction and/or wind speed. A portion of the turbine control system resides within a control panel 150. In the exemplary embodiment, nacelle 106 includes forward support bearing 152 and aft support bearing 154. Alternatively, nacelle 106 may include any number of shaft and bearing support arrangements that enables wind turbine 100 to function as described herein. Support bearings 152 and 154 provide radial support and alignment of rotor shaft 134, as well as enable transmission of all loads associated with rotor 108 into tower 102 and ultimately into supporting surface 104.

Wind turbine 100 includes a pitch control system 200. In one embodiment, at least a portion of pitch control system 200 is positioned in nacelle 106. Alternatively, at least a portion of pitch control system 200 is positioned outside nacelle 106. Specifically, at least a portion of pitch control system 200 described herein includes at least one processor 202 and a memory device (not shown), and at least one input/output (I/O) conduit 204, wherein I/O conduit 204 includes at least one I/O channel (not shown). More specifically, processor 202 is positioned within control panel 150. Pitch control system 200 substantially provides a technical effect of wind turbine noise reduction as described herein.

As used herein, the term processor is not limited to integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may include, without limitation, computer peripherals associated with an operator interface, such as a mouse and a keyboard. Alternatively, other computer peripherals may also be used that may include, without limitation, a scanner. Furthermore, in the exemplary embodiment, additional output channels may include, without limitation, an operator interface monitor.

Processor 202 and other processors (not shown) as described herein process information transmitted from a plurality of electrical and electronic devices that may include, without limitation, blade pitch position feedback devices 206 (described further below) and electric power generation feedback devices (not shown). RAM and storage devices (not shown) store and transfer information and instructions to be executed by processor 202. RAM and storage devices can also be used to store and provide temporary variables, static and dynamic (i.e., non-changing and changing) information and instructions, or other intermediate information to processor 202 during execution of instructions by processor 202. Instructions that are executed include, but are not limited to, resident blade pitch system 200 control commands. The execution of sequences of instructions is not limited to any specific combination of hardware circuitry and software instructions.

In the exemplary embodiment, at least a portion of pitch control system 200 including, but not limited to, processor 202 is positioned within control panel 150. Moreover, processor 202 is coupled to blade pitch drive motors 131 via at least one I/O conduit 204. I/O conduit 204 includes any number of channels having any architecture including, but not limited to, Cat 5/6 cable, twisted pair wiring, and wireless communication features. Pitch control system 200 may include distributed and/or centralized control architectures.

Pitch control system 200 also includes a plurality of independent blade pitch position feedback devices 206 coupled with processor 202 via at least one I/O conduit 204. In the exemplary embodiment, each pitch drive mechanism 130 is associated with a single blade pitch position feedback device 206. Alternatively, any number of blade pitch position feedback devices 206 may be associated with each pitch drive mechanism 130. Therefore, in the exemplary embodiment, pitch drive mechanism 130 and associated drive motor 131, as well as blade pitch position feedback device 206, are included in system 200 as described herein. Each blade pitch position feedback device 206 measures a pitch position of each blade 112, or more specifically an angle of each blade 112 with respect to wind 124 (shown in FIG. 1) and/or with respect to hub 110. Blade pitch position feedback device 206 may include any suitable sensor having any suitable location within or remote to wind turbine 100, such as, but not limited to, optical angle encoders, magnetic rotary encoders, and incremental encoders, or some combination thereof. Moreover, blade pitch position feedback device 206 transmits pitch measurement signals (not shown) that are substantially representative of associated blade 112 pitch position to processor 202 for processing thereof.

Figure 3:
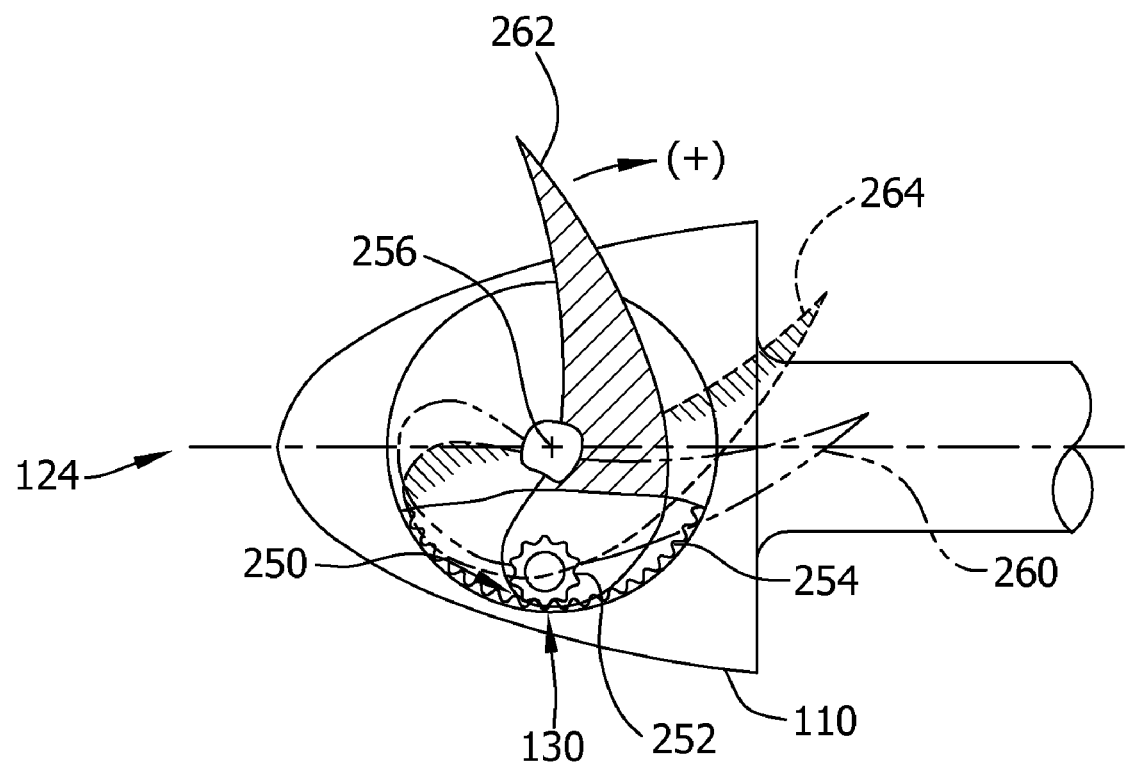
FIG. 3 is a cross-sectional view of a portion of a rotor hub of the wind turbine shown in FIGS. 1 illustrating an exemplary embodiment of a pitch system for changing a pitch of a rotor blade of the wind turbine shown in FIGS. 1.

FIG. 3 is a cross-sectional view of hub 110 illustrating an exemplary pitch drive mechanism 130. In the exemplary embodiment, pitch drive mechanism 130 is operatively coupled to processor 202 (shown in FIG. 2) for control thereby, and includes at least one pitch actuator 250 having a pitch drive gear 252 and a pitch ring gear 254 that are operatively coupled to hub 110 and rotor blades 112. During wind turbine operation, pitch actuator 250 changes a pitch angle of rotor blades 112 by rotating rotor blades 112 with respect to hub 110, as described in more detail herein. More specifically, pitch ring gear 254 is coupled to rotor blade 112 such that rotation of pitch drive gear 252 rotates rotor blade 112 about an axis of rotation 256 to thereby change the pitch of rotor blade 112. In an alternative embodiment, pitch actuator 250 may include any suitable structure, configuration, arrangement, and/or components that enable pitch drive mechanism 130 to function as described herein including, but not limited to, electrical motors, hydraulic cylinders, springs, and/or servomechanisms. Moreover, pitch actuator 250 may be driven by any suitable system including, but not limited to, hydraulic fluid, electrical power, electro-chemical power, and/or mechanical power, such as for example, spring force.

In the exemplary embodiment, at a wind velocity of 0 miles per hour (MPH) but below a cut-in speed, rotor blades 112 are positioned in a fully feathered position 260, i.e., fully pitched into the oncoming wind 124, and the generator rotor speed is equal to or approximately 0 revolutions per minute (RPM). As the wind velocity increases to the cut-in speed, rotor blades 112 are pitched to full operational position 262. Immediately prior to the cut-in speed, rotor blades 112 will be pitched to an intermediate position 264 to facilitate reinforcement of the rotor shaft speed increase, as described in more detail herein.

Pitch actuator 250 may be driven by energy extracted from rotational inertia of rotor 108 and/or a stored energy source (not shown) that supplies components of wind turbine 100, such as, but not limited to, pitch drive mechanism 130, energy during an anomaly in the electrical load and/or power source coupled to wind turbine 100. For example, an anomaly in the electrical load and/or power source may include, but is not limited to, a power failure, an undervoltage condition, an overvoltage condition, and/or an out-of-frequency condition. As such, the stored energy source enables pitching of rotor blades 112 during the anomaly. Although other stored energy sources may be used, in some embodiments the stored energy source includes hydraulic accumulators, electrical generators, stored spring energy, capacitors, and/or batteries. The stored energy sources may be located anywhere within, on, adjacent to, and/or remote from wind turbine 100. In some embodiments, the stored energy source stores energy extracted from rotational inertia of rotor 108, and/or other auxiliary energy sources such as, but not limited to, an auxiliary wind turbine (not shown) coupled to wind turbine 100, solar panels, and/or hydro-power installations.

Figure 4:
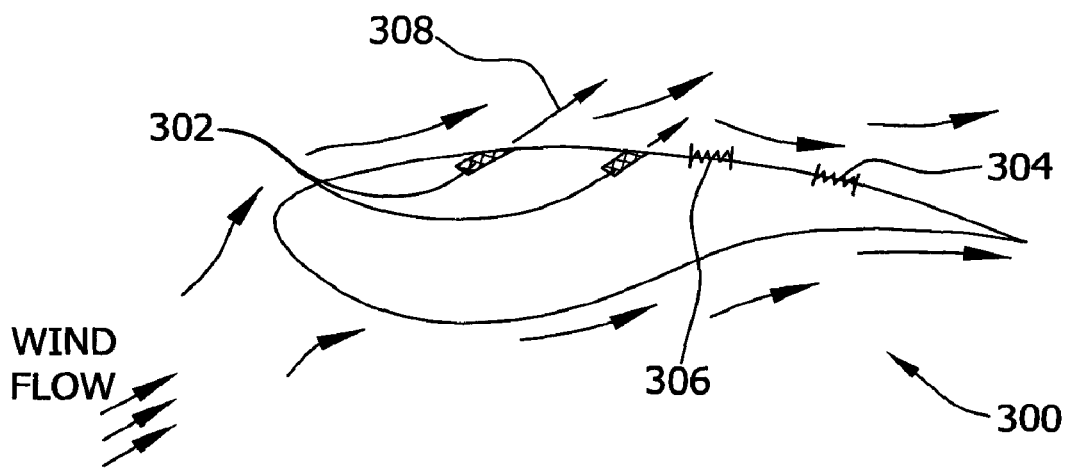
FIG. 4 is a cross-sectional view of an exemplary wind turbine blade assembly used with the exemplary wind turbine shown in FIG. 1.

FIG. 4 is a cross-sectional view of an exemplary wind turbine blade assembly 300 suitable for use with the exemplary wind turbine 100 shown in FIG. 1. In the exemplary embodiment, flow separation is inhibited (for example, diminished and/or delayed) by a plurality of active flow modification devices 302, such as for example blowing or suction flow, piezoelectric synthetic jets or zero net-mass actuators, other synthetic jet devices such as dual bimorph synthetic jet (DBSJ) devices, or any combination thereof. In an alternative embodiment, non-zero mass flow actuation devices, such as "flip-flop" or alternative jets, fluidic oscillators that provide pulsed velocity jets, and blowing or suction flow may be used.

A flow separation point is represented as being at a position 304 as opposed to at an upstream position 306 where it would naturally result without active flow modification. In the exemplary embodiment, flow separation is inhibited by introducing a steady or unsteady (time dependent) jet flow 308 having a large component of momentum and vorticity substantially along the wind flow proximate to the blade. Jet flow 308 adds momentum and vorticity in the wind flow proximate to the blade in a form of the process known as "shear layer mixing". When vorticity and momentum are added by the active flow modification, the momentum deficit of boundary layers is at least partially re-energized, and the flow separation is inhibited and available lift is enhanced. An air flow wherein separation has been inhibited aids in adding lift to rotor blade 112, thereby increasing the performance of the turbine for a given blade length or reducing the blade chord dimension that may be required for a given level of performance. More specifically the exemplary wind turbine 100 described herein enables reduced chord dimension to be traded for increased blade length resulting in increased energy production for the same or lower blade weight, i.e., rotor 108 loads imparted to wind turbine 100. Active flow modification devices 302 may add or subtract momentum and vorticity at particular jet-to-incident flow ratio and specific jet angles relative to the wind flow proximate to rotor blade 112, wherein such angles may be varied according to the desired range of performance conditions.

Figure 5:
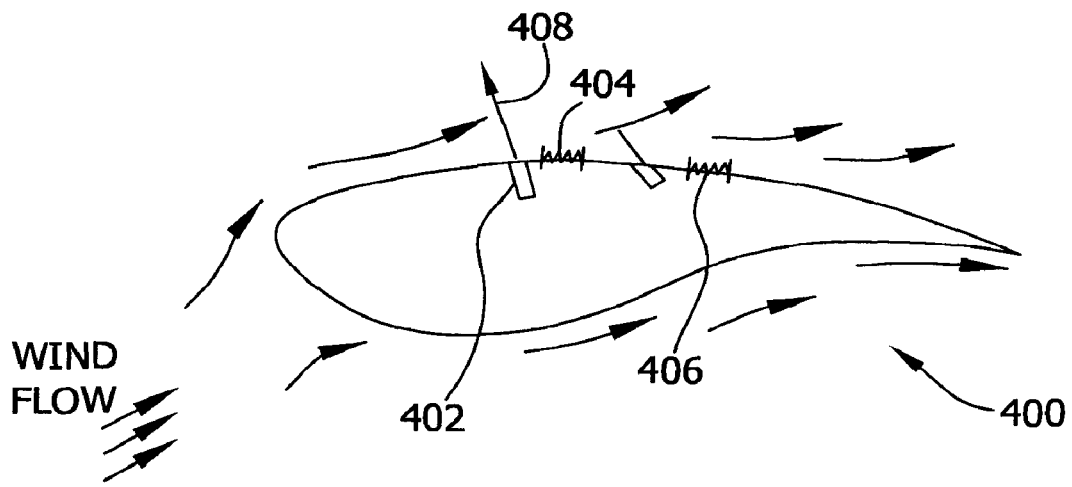
FIG. 5 is a cross-sectional view of an alternative wind turbine blade assembly used with the exemplary wind turbine shown in FIG. 1.

FIG. 5 is a cross-sectional view of an alternative wind turbine blade assembly 400 suitable for use with the exemplary wind turbine 100 shown in FIG. 1. In the exemplary embodiment, an active flow modification device 402 promotes flow separation. For example, the flow separation point is represented as being at a position 404 as opposed to a downstream position 406 where it would naturally result without active flow modification. Flow separation is promoted by introducing a steady or unsteady jet flow 408 having a large component of momentum substantially disruptive to the wind flow proximate to rotor blade 112. The steady or unsteady jet flow 408 initiates flow separation in the wind flow proximate to the blade. In the exemplary embodiment, jet flow 408 may be an oblique jet flow that obstructs the natural wind flow proximate to the blade. The promoted flow separation results in a decreased lift, and may be advantageously employed to mitigate undesirable loading conditions during wind turbine operation. Such undesirable conditions include cases of increased wind flow velocity that leads to an increased loading of rotor blades 112 (increased lift) and attendant effects on wind turbine 100. The embodiments shown in FIG. 5 and described herein provide for artificially decreasing the lift, nearly instantaneously in certain cases, by actively modifying the wind flow proximate to rotor blade 112. Active flow modification devices 402 may add disruptive momentum at a particular jet-to-incident flow ratio and at specific angles to a wind flow proximate to rotor blade 112, and such angles may be varied according to the desired range of performance conditions.

Figure 6:
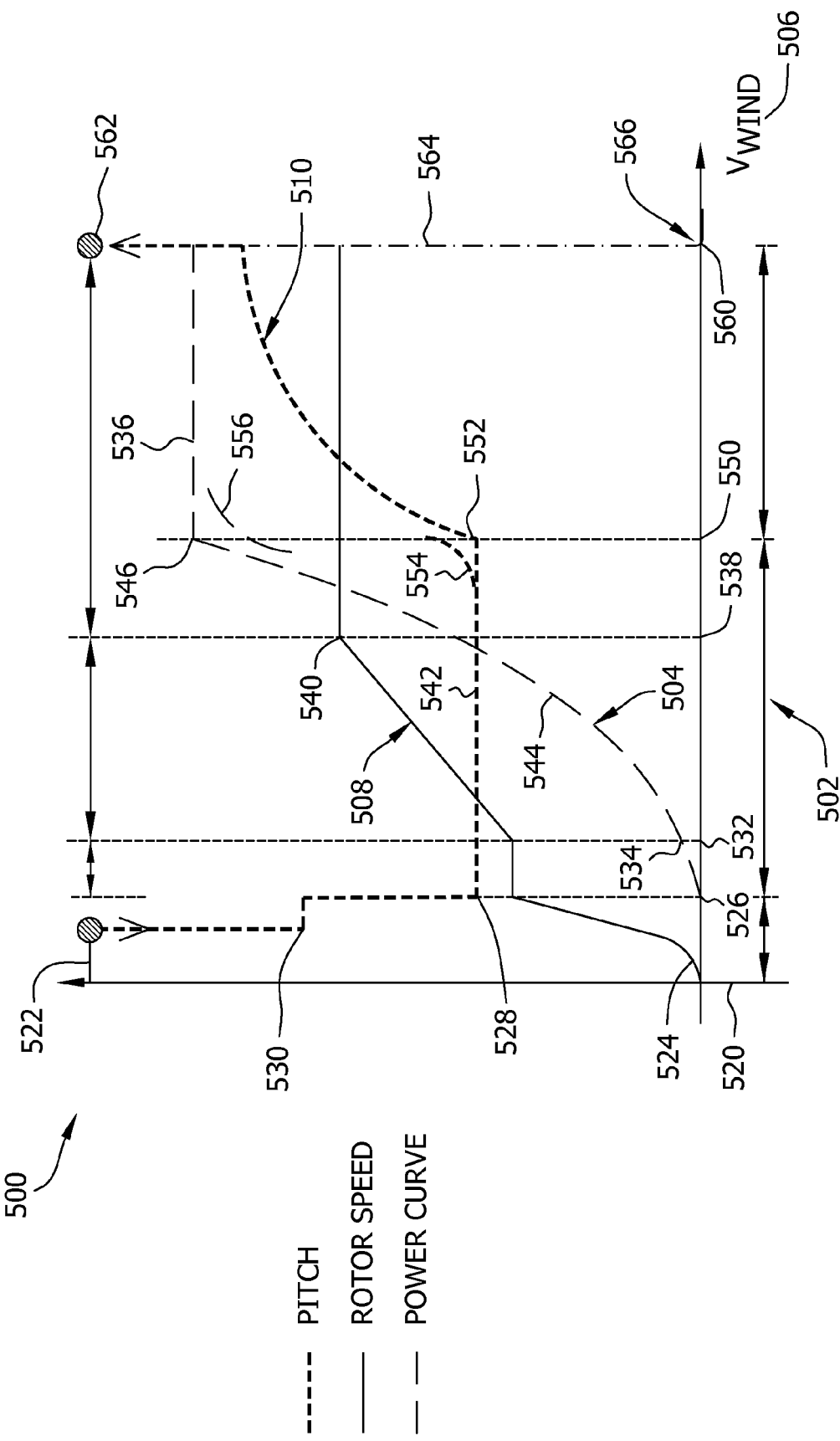
FIG. 6 is a graph illustrating a wind turbine operational regime with respect to wind velocity, wherein wind turbine speed and blade pitch schedules control power production.

FIG. 6 is a graph 500 illustrating a wind turbine operational regime 502 wherein wind turbine blade pitch is varied relative to wind velocity to facilitate turbine operation that, in the exemplary embodiment, includes controlling generator speed and power production, as described in more detail herein. More specifically, FIG. 6 illustrates a power curve 504 as a function of wind velocity 506, a wind turbine generator speed plot 508 as a function of wind velocity 506, and a wind turbine rotor pitch plot 510 as a function of wind velocity 506. In the exemplary embodiment, at a wind velocity of 0 miles per hour (MPH) 520 but below a cut-in speed 526, rotor blades 112 are positioned in a fully feathered position 522, i.e., fully pitched into the oncoming wind 124, and the generator rotor speed 524 is equal to or approximately 0 revolutions per minute (RPM). Alternatively, at a wind velocity slightly greater than 0 MPH 520, rotor blades 112 may be positioned at an intermediate blade angle 530, such as for example approximately 24% of the total pitch range from fully feathered position 522 to a full operational blade angle 528.

In the exemplary embodiment, as wind velocity increases to cut-in speed 526, rotor blades 112 are pitched to full operational position 528 of approximately 0°. In the exemplary embodiment, immediately prior to cut-in speed 526, rotor blades 112 will be pitched to intermediate position 530 to facilitate reinforcement of the rotor shaft speed increase. In an alternative embodiment, rotor blades 112 may not be pitched prior to cut-in speed 526, but may alternatively maintain the fully feathered position 522 until cut-in speed 526 is reached.

As wind velocity increases beyond cut-in speed 526, a cut-in condition 532 is achieved and billable power production (i.e., electricity sent to the grid) commences 534. More specifically, generator 132 begins to produce power 534 which, in the exemplary embodiment, is approximately 2% of full generator rating 536 at cut-in condition 532, as described in more detail herein. Alternatively, generator 132 produces any amount of power that enables wind turbine 100 to function as described herein.

As wind velocity increases to a speed 538 such that the generator 132 reaches a rated speed 540, rotor blade pitch continues to be maintained 542 at full operational mode, i.e., approximately 0° pitch configuration. In the exemplary embodiment, between wind velocity 532 and wind velocity 538, power production 544 increases substantially with the cube of the wind velocity until the wind velocity facilitates increasing the generator speed to a point 546 that signifies rated power level 536 of wind turbine 100. In the exemplary embodiment, at a wind velocity 550 rotor blades 112 start to be pitched 552 towards feathered such that power production is maintained at the rated power level 536. In an alternative embodiment, rotor blades 112 may be trimmed in a peak shaver mode 554 to facilitate reducing the wind turbine loads prior to reaching rated power level 536 of the wind turbine. More specifically, while in peak shaver mode 554, rotor blades 112 are trimmed gradually towards the feathered configuration 556 prior to reaching rated power level 536 of wind turbine 100.

As the wind speed reaches a cut-out speed 560, rotor blades 112 are trimmed to the fully feathered configuration 562 (equivalent to fully feathered position 522) and generator 132 reaches a cut-out condition 564, wherein power generation and generator speed are reduced to approximately 0, denoted by point 566. Such a configuration protects wind turbine 100 against damage to wind turbine components due to exceeding mechanical loads (forces and moments) and torque limitations for such components.

Figure 7:
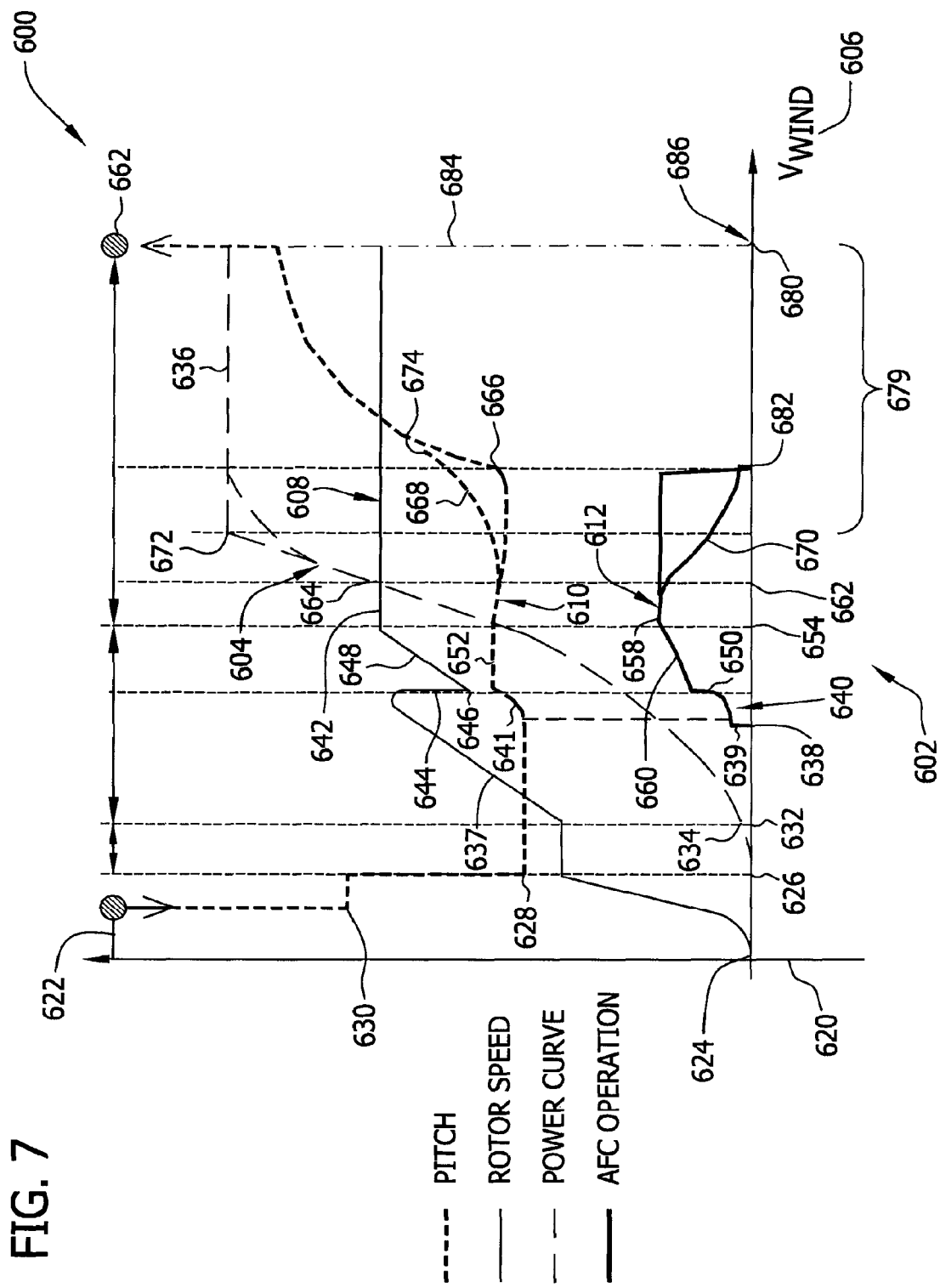
FIG. 7 is a graph illustrating a wind turbine operational regime with respect to wind velocity using an active flow control (AFC) device, wherein wind turbine speed and blade pitch schedules control power production.

FIG. 7 is a graph 600 illustrating a wind turbine operational regime 602 using an active flow control (AFC) device, such as for example active flow modification device 302 shown in FIG. 4, wherein wind turbine blade pitch is varied relative to the wind velocity to facilitate wind turbine operation that includes controlling generator speed in region 679 in coordination with power production, as described in more detail herein. More specifically, FIG. 7 illustrates a power curve 604 as a function of wind velocity 606, a wind turbine generator speed plot 608 as a function of wind velocity 606, a wind turbine rotor pitch plot 610 as a function of wind velocity 606, and an AFC device operational magnitude plot 612 as a function of wind velocity 606. In the exemplary embodiment, at a wind velocity of approximately 0 miles per hour (MPH) 620, rotor blades 112 are positioned in a fully feathered configuration 622, i.e., fully pitched into the oncoming wind 124, and a generator rotor speed 624 is equal to or approximately 0 revolutions per minute (RPM). Alternatively, at a wind velocity slightly above 0 MPH 620 (but below a cut-in speed 626), rotor blades 112 may be positioned at an intermediate blade angle 630, such as for example approximately 24% of the total pitch range from fully feathered position 622 to full operational blade angle 628.

In the exemplary embodiment, as wind velocity increases to a cut-in speed 626, rotor blades 112 are pitched to a full operational position 628 of approximately 0°. In the exemplary embodiment, immediately prior to cut-in speed 626, rotor blades 112 will be pitched to an intermediate position 630 to facilitate reinforcement of the rotor shaft speed increase. In an alternative embodiment, rotor blades 112 may not be pitched prior to cut-in speed 626, but may alternatively maintain a fully feathered configuration 622 until cut-in speed 626 is reached.

As wind velocity increases beyond cut-in speed 626, a cut-in condition 632 is achieved and billable power production (i.e., electricity sent to the grid) commences 634. More specifically, generator 132 begins to produce power 634 which, in the exemplary embodiment, is approximately 2% of full generator rating 636 at cut-in condition 632, as described in more detail herein. Alternatively, generator 132 produces any amount of power at cut-in condition 632 that enables wind turbine 100 to function as described herein.

As wind velocity increases beyond cut-in condition 632 the generator RPM speed increases substantially linearly 637 therewith, and at an activation wind speed 638, an active flow control (AFC) device is activated 639. More specifically, and in the exemplary embodiment, at activation wind speed 638 the AFC device is activated 639 at a minimum or substantially minimum setting 640, as described in more detail herein. Substantially simultaneously with activation 639 of the AFC device, processor 202 adjusts rotor blades 112 slightly towards feathered position 641, such as for example 5%-10% of full feathered position, to facilitate a smooth transition of the generator speed in reaching a generator rated speed 642. In an alternate embodiment, utilizing a different blade design, the foregoing pitch adjustment may be opposite and slightly beyond the operational position (i.e., away from feathered). Following activation 639 of the AFC device, generator speed slightly decreases 644 as a function of the specific blade design, change in pitch and the parasitic power requirements associated with the AFC device activation 639. As wind speed increases beyond activation wind speed 638, generator speed reaches a minimum AFC transition point 646 and increases 648 therefrom as a function of an increase in an AFC device setting 650. The pitch setting is maintained 652 at an angle below the full operational angle, as described herein.

In the exemplary embodiment, as wind velocity increases beyond the minimum AFC transition point 646 to a speed 654, generator 132 reaches generator rated speed 642, and rotor blade pitch continues to be maintained 652 at an angle less than full operational position 628, as described herein. In an alternate embodiment, utilizing a different blade design, the foregoing pitch adjustment may be opposite and slightly beyond operational position (i.e., away from feathered or greater then the full operational position). The AFC device is increased to a fully activated configuration 658 to facilitate increasing lift while substantially prohibiting airflow separation from rotor blade 112. In an alternative embodiment, the AFC device may be continuously, linearly or non-linearly increased 660 to a full-on configuration, or stepped in predetermined increments in any combination thereof to the full-on configuration.

As wind velocity increases beyond speed 654 to a speed 662, generator speed is maintained at a rated speed 664, while rotor blade pitch is trimmed towards a full operational position 666 of approximately 0° to maintain the power generation in accordance with power curve 604. In the exemplary embodiment, as wind velocity increases beyond speed 662, rotor blades 112 are trimmed in a peak shaver mode 668 in combination with a decrease in AFC device operations 670 to facilitate reducing the wind turbine loads prior to reaching a rated power level 672 of wind turbine 100. More specifically and in the exemplary embodiment, while in peak shaver mode 668, rotor blades 112 are trimmed gradually towards feathered configuration 674 subsequent to reaching rated power level 672 of wind turbine 100 substantially simultaneously with decreasing AFC device operations 670 as the power generation approaches rated power level 672.

As the wind velocity 606 continues to increase towards a cut-out speed 680, the AFC device is disabled 682, rotor blades 112 are progressively trimmed towards the fully feathered configuration 622 and the generator speed reaches a cut-out condition 684, wherein power generation and generator speed are reduced to approximately 0, denoted by point 686. Such a configuration protects wind turbine 100 against damage to wind turbine components due to exceeding mechanical loads (forces & moments) and torque limitations for such components.

Exemplary embodiments of active flow control systems and operation strategies are described in detail above. The above-described methods for implementing such active flow control systems facilitate effective use of the AFC device. More specifically, the systems and methods described herein combine substantially uniform AFC operations with rotor blade pitch control to facilitate mitigating uniform and non-uniform rotor scale events (i.e., wind gusts), wind shear events, and local noise generation events by increasing and decreasing lift on the rotor blades. Such strategies provide maximum energy production with low parasitic power consumption typically required to power the AFC device over the range of turbine operating conditions. Use of such an AFC system further facilitates providing a rotor blade with a reduced chord length over at least a portion of the rotor blade, in turn enabling increased blade length (i.e., increased rotor swept area) with attendant increase in energy production without increasing loads and improving blade efficiency over a broader range of operating conditions. Such a configuration facilitates increasing a total value of the wind turbine system while reducing cost of energy production.

While the apparatus and methods described herein are described in the context of methods for implementing active flow control systems on wind turbine blades, it is understood that the apparatus and methods are not limited to wind turbine applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for optimizing energy production in a wind turbine, the wind turbine having a plurality of rotor blades and a generator, said method comprising:
   pitching the plurality of rotor blades towards a full operational angle;
   activating an active flow control device in combination with a generator speed of the generator and a rotor blade pitch setting to facilitate maintaining a predetermined generator rated power level; and,
   maintaining a pitch of the plurality of rotor blades at an angle less than the full operational angle while substantially simultaneously activating the active flow control device.

2. A method in accordance with claim 1, wherein prior to pitching the plurality of rotor blades to the full operational angle, said method further comprising:
   determining a wind speed sufficient to enable power production;
   measuring a wind speed over a duration of time; and,
   if the wind speed is determined to be sufficient to enable power production, pitching the plurality of rotor blades to a minimum operational angle.

3. A method in accordance with claim 1, wherein activating the active flow control device in combination with the generator speed and the rotor blade pitch setting further comprises:
   activating the active flow control device prior to achieving a generator rated power for the wind turbine;
   upon achieving a rated speed of the wind turbine, adjusting the active flow control device to a fully activated mode; and,
   upon achieving the generator rated power, adjusting the active flow control device from the fully activated mode.

4. A method in accordance with claim 3, wherein adjusting the active flow control device to the fully activated mode comprises adjusting the active flow control device in combination with at least one of a pitch of the plurality of rotor blades and a rotational speed of the plurality of rotor blades.

5. A method in accordance with claim 3, further comprising, subsequent to activating the active flow control device, pitching the plurality of rotor blades towards a feathered position.

6. A method in accordance with claim 3, wherein adjusting the active flow control device from the fully activated mode comprises adjusting the active flow control device while substantially simultaneously pitching the plurality of rotor blades towards a feathered position.

7. A method in accordance with claim 3, further comprising, upon reaching a pre-determined cut-out speed for the wind turbine, pitching the plurality of rotor blades towards a fully feathered position to facilitate preventing damage to the wind turbine.

8. A method of operating a wind turbine, said method comprising:
   operatively coupling an active flow control device to a control system within the wind turbine;
   pitching a plurality of rotor blades to a full operational angle;
   activating the active flow control device prior to achieving a generator rated power for the wind turbine;
   maintaining a pitch of the plurality of rotor blades at an angle less than the full operational angle while substantially simultaneously activating the active flow control device to facilitate a transition of a generator speed to reach a generator rated speed;
   upon achieving a rated speed of the wind turbine, adjusting the active flow control device to a fully activated mode; and,
   upon achieving the generator rated power, adjusting the active flow control device from the fully activated mode.

9. A method in accordance with claim 8, wherein prior to pitching the plurality of rotor blades to the full operational angle, said method further comprising:
   determining a wind speed sufficient to enable power production;
   measuring the wind speed over a duration of time to; and,
   if the wind speed is determined to be sufficient to enable power production, pitching the plurality of rotor blades to a minimum operational angle.

10. A method in accordance with claim 8, wherein adjusting the active flow control device to the fully activated mode comprises adjusting the active flow control device in combination with at least one of a pitch of the plurality of rotor blades and a rotational speed of the plurality of rotor blades.

11. A method in accordance with claim 8, further comprising, subsequent to activating the active flow control device, pitching the plurality of rotor blades towards a feathered position.

12. A method in accordance with claim 8, wherein adjusting the active flow control device from the fully activated mode comprises adjusting the active flow control device while substantially simultaneously pitching the plurality of rotor blades towards a feathered position.

13. A method in accordance with claim 8, further comprising, upon reaching a pre-determined cut-out speed for the wind turbine, pitching the plurality of rotor blades towards a fully feathered position to facilitate preventing damage to the wind turbine.

14. A method in accordance with claim 8, wherein subsequent to activating the active flow control device, further comprising maintaining a pitch of the plurality of rotor blades at an angle less than the full operational angle.

15. A wind turbine comprising:
   a generator;
   a plurality of rotor blades;

an active flow control device operatively coupled to a respective rotor blade of the plurality of rotor blades; and, a control system communicatively coupled to the active flow control device and configured to optimize energy production in the wind turbine based on a generator speed, a rotor blade pitch setting and an active flow control device setting, said control system comprising a processor programmed to:

pitch the plurality of rotor blades towards a full operational angle;

activate the active flow control device in combination with a generator speed of said generator and the rotor blade pitch setting to facilitate maintaining a predetermined generator rated power level; and, maintain a pitch of the plurality of rotor blades at an angle less than the full operational angle while substantially simultaneously activating the active flow control device.

16. A wind turbine in accordance with claim 15, wherein said processor is further programmed to:

activate the active flow control device prior to achieving a generator rated power for the wind turbine;

upon achieving a rated speed of the wind turbine, adjust the active flow control device to a fully activated mode; and, upon achieving the generator rated power, adjust the active flow control device from the fully activated mode.

17. A wind turbine in accordance with claim 16, wherein prior to pitching the plurality of rotor blades to the full operational angle, said processor is programmed to:

measure a wind speed over a duration of time to determining a wind speed sufficient to enable power production; and, pitch the plurality of rotor blades to a minimum operational angle if the wind speed is determined to be sufficient to enable power production.

18. A wind turbine in accordance with claim 16, wherein said processor programmed to adjust the active flow control device to a fully activated mode comprises adjusting the active flow control device with at least one of stepped increments and substantially continuous adjustment in combination with at least one of a pitch of the plurality of rotor blades and a rotational speed of the plurality of rotor blades.

19. A wind turbine in accordance with claim 16, wherein, subsequent to activating the active flow control device, said processor is further programmed to pitch the plurality of rotor blades towards a feathered position.

20. A wind turbine in accordance with claim 16, wherein said processor programmed to adjust the active flow control device from the fully activated mode comprises said processor programmed to at least one of adjust the active flow control device substantially continuously, linearly and non-linearly and substantially simultaneously pitch the plurality of rotor blades towards a feathered position.

21. A wind turbine in accordance with claim 16, wherein, upon reaching a pre-determined cut-out speed for the wind turbine, said processor is programmed to pitch the plurality of rotor blades towards a fully feathered position to facilitate preventing damage to the wind turbine.

* * * * *